Feb. 18, 1964

C. A. KIEFFABER 3,121,406

BREAD MOLDER

Filed June 1, 1961

INVENTOR.
CLARENCE A. KIEFFABER
BY
Alfred R. Fuchs
ATTORNEY

Feb. 18, 1964 C. A. KIEFFABER 3,121,406
BREAD MOLDER

Filed June 1, 1961 3 Sheets-Sheet 2

INVENTOR.
CLARENCE A. KIEFFABER
BY
Alfred R. Fuchs
ATTORNEY

Feb. 18, 1964     C. A. KIEFFABER     3,121,406
BREAD MOLDER

Filed June 1, 1961     3 Sheets—Sheet 3

INVENTOR.
CLARENCE A. KIEFFABER
BY
Alfred R. Fuchs
ATTORNEY

United States Patent Office
3,121,406
Patented Feb. 18, 1964

3,121,406
BREAD MOLDER
Clarence A. Kieffaber, Overland Park, Kans., assignor to Stickelber & Sons, Inc., a corporation of Missouri
Filed June 1, 1961, Ser. No. 125,310
5 Claims. (Cl. 107—9)

My invention relates to bread molding machines, and more particularly to means for compacting and axially elongating a coiled up dough piece and for turning the compacted and elongated dough piece so as to feed the same to a coiling apparatus at an oblique angle.

In making a loaf out of an elongated rod-like piece of dough coiled up in a helicoidal form with the turns of the helicoid in axial adjacency and of approximately zero internal diameter, as by the machine disclosed in the application of Duard W. Enoch et al., Serial No. 53,557 filed September 1, 1960, on Loaf Coiling Bread Molding Machine, a dough ball is sheeted in the usual manner and curled into a scroll, which scroll is compacted and elongated, and compacted elongated dough piece, which is of a rod-like character, is fed, to the means for coiling the same into a helicoidal form onto a conveyor belt forming part of said coiling mechanism at an oblique angle to the direction of travel of said belt.

It is a purpose of my invention to provide means for compacting and axially elongating a scroll of dough that has been formed from a sheeted dough piece in such a manner as to reduce or substantially eliminate any distortion of the cells in the loaf due to such compacting and elongation of the scroll. When a dough loaf made up of a sheet of dough coiled up on itself in a scroll is compacted and elongated between a pressure board and a conveyor belt the dough piece rotates about its own axis in a direction determined by the direction of travel of the belt with respect to the stationary pressure board and this causes an elongation or distortion of the cells in the dough piece in a direction related to the direction of rotation about its axis of said dough piece. This is particularly true, if the dough piece is elongated to a greater extent than is necessary when a loaf of bread is made by ordinary molding methods by merely curling up the dough piece in a scroll and compacting it so as to form a molded loaf, the elongation being, in such ordinary molding methods, only incidental to the compacting action. However, when a dough piece is to be elongated sufficiently to spirally coil the same about the longitudinal axis of the loaf into a helicoidal form, much more elongation of the dough piece is necessary than merely to compact the scroll. Accordingly the distortion of the cells due to such greater elongation is increased. I have found that by compacting and axially elongating a scroll of dough of the above referred to character by rotating the scroll between a pressure board and a conveyor about its axis first in one direction and then a substantially equal amount in the opposite direction this cell distortion is eliminated. Also any distortion of the ends of the compacted and elongated scroll is avoided by so compacting and axially elongating the dough piece.

More specifically my invention comprises means for compacting and axially elongating a scroll of sheeted dough, comprising the conveyor belt forming part of the curling mechanism and a pressure board cooperating therewith to rotate the scroll between the pressure board and the conveyor belt about its axis in one direction and a conveyor belt and pressure board located below said first mentioned conveyor belt and pressure board receiving the dough pieces from the first mentioned conveyor belt, said conveyor belt traveling in the opposite direction to the first mentioned conveyor belt to thereby rotate the partially elongated scroll between the second conveyor belt and second pressure board in the opposite direction.

It is a further purpose of my invention to provide means between said second mentioned conveyor belt and a conveyor belt traveling at right angles thereto, to transfer the compacted elongated dough piece from the second conveyor belt to the last mentioned conveyor belt in such a manner as to deposit the dough piece on said last mentioned conveyor belt with its longitudinal axis extending at an oblique angle to the direction of travel of said last mentioned conveyor belt.

More specifically my invention comprises an arcuate conveyor belt mounted on a frame that has a pair of shafts mounted thereon so that their axes extend at an oblique angle to each other, on which shafts rollers are mounted, over which said arcuate conveyor belt travels, and to provide means for driving said arcuate conveyor belt by means that exert a pulling action on the outer peripheral edge portion thereof.

It is a further purpose of my invention to provide an arcuate conveyor belt of the above mentioned character, that is mounted so as to extend under the discharge end of the conveyor belt that forms part of the elongating and compacting means, and which extends over the conveyor belt that extends at right angles thereto, and to provide means for driving said arcuate conveyor belt comprising an arcuate guideway on the frame, a sprocket chain operating therein, and yielding means connecting said chain with the outer peripheral portion of the conveyor belt, with sprockets on the angularly related shafts around which the sprocket chain engages and means for driving one of the sprockets.

Preferably the frame carrying the arcuate conveyor belt is mounted detachably in position between the conveyor belt that delivers the dough pieces to the arcuate conveyor belt and the conveyor belt to which the dough pieces are delivered obliquely thereby so that, when desired, said conveyor having the arcuate belt can be removed, and a transfer mechanism substituted therefor, that will deliver the dough pieces parallel to the direction of travel of said last mentioned conveyor belt, should it be desired to use the molding machine for molding loaves that are not helically coiled.

Other objects and advantages of my invention will appear as the description of the drawings proceeds. I desire to have it understood, however, that I do not intend to limit myself to the particular details shown or described, except as defined by the claims.

In the drawings:
FIG. 1 is a plan view of a portion of a bread molding machine made in accordance with my invention.

Figure 1:
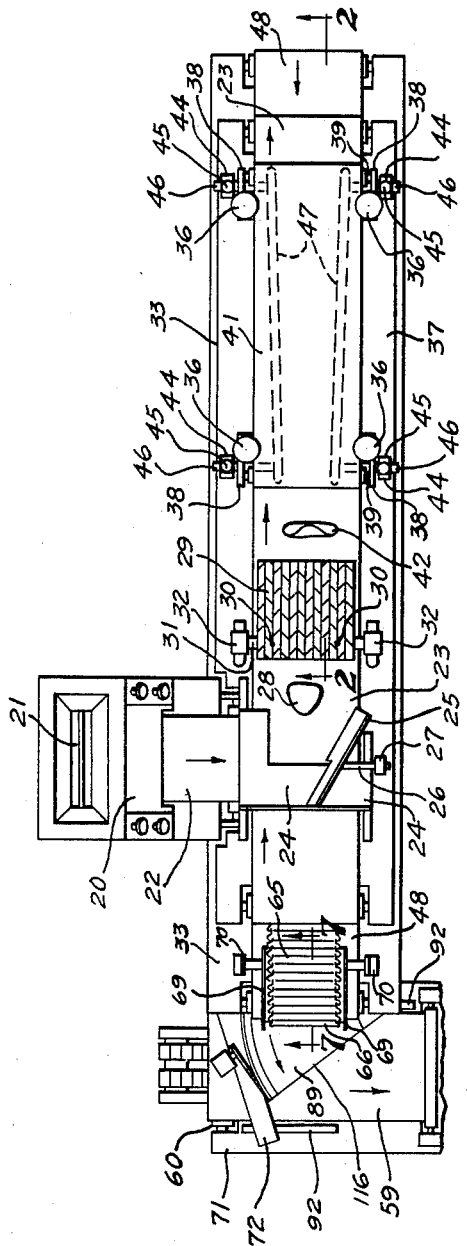

Referring in detail to the drawings, in FIG. 1 is shown a bread molding machine made in accordance with my invention, which is provided with a sheeting mechanism 20, into the hopper 21 of which dough balls are fed from any suitable conveying means. The sheeted dough pieces pass from the sheeting rolls of the sheeting mechanism to a conveyor belt 22, which operates at a high speed to project the sheeted dough pieces across a curling conveyor belt 23. Preferably an L-shaped plate 24 is provided, over which the sheeted dough pieces pass in being transferred from the conveyor belt 22 to the belt 23, a suitable deflecting stop member 25 being provided, which is mounted so as to extended over a portion of the plate 24 and over the conveyor belt 23, as shown in FIG. 1. The position of the stop member 25 is adjustable, having a bar 26 extending therefrom that is adjustably mounted in a bracket 27 for locating the stop member at a desired position so as to properly locate the sheeted dough piece 28 on the conveyor belt 23 for cooperation with the curling chain 29, which is mounted on suitable pins 30 on a cross member 31 mounted on the brackets 32, whereby the position of the curling chain 29 lengthwise of the curling conveyor belt 23 and the length of the curling chain 29 in engagement with the curling belt 23 can be adjusted as may be found desirable.

Figure 8:
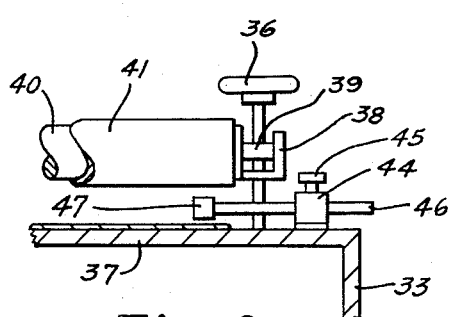
FIG. 8 is a fragmentary sectional view taken on the line 8—8 of FIG. 2.

Mounted on the frame 33 so as to overlie the conveyor belt 23 (see FIGS. 1, 2 and 8) is a pressure board having a plate-like body portion 34, which is adjustable toward and away from the surface of the conveyor belt 23 by means of adjusting members 35 provided with hand wheels 36, which adjusting members are screw-threadedly engaged in suitable openings in the top plate 37 of the frame 33 and mounted against endwise movement in suitable bearings on the plate-like member 34 whereby rotation of the hand wheels 36 will permit of adjustment of the plate-like member 34 toward and away from the top surface of the belt 23 in a well known manner. Bracket 38 are provided on the plate-like body portion 34 of the pressure board, which are provided with bearings for the shafts 39 of the rollers 40, over which a belt-like flexible fabric member 41 extends, said belt-like fabric member 41 being provided so as to present a clean surface to the coiled up piece of dough as it passes under the belt 41 on the under side of the backing plate 34.

Figure 2:
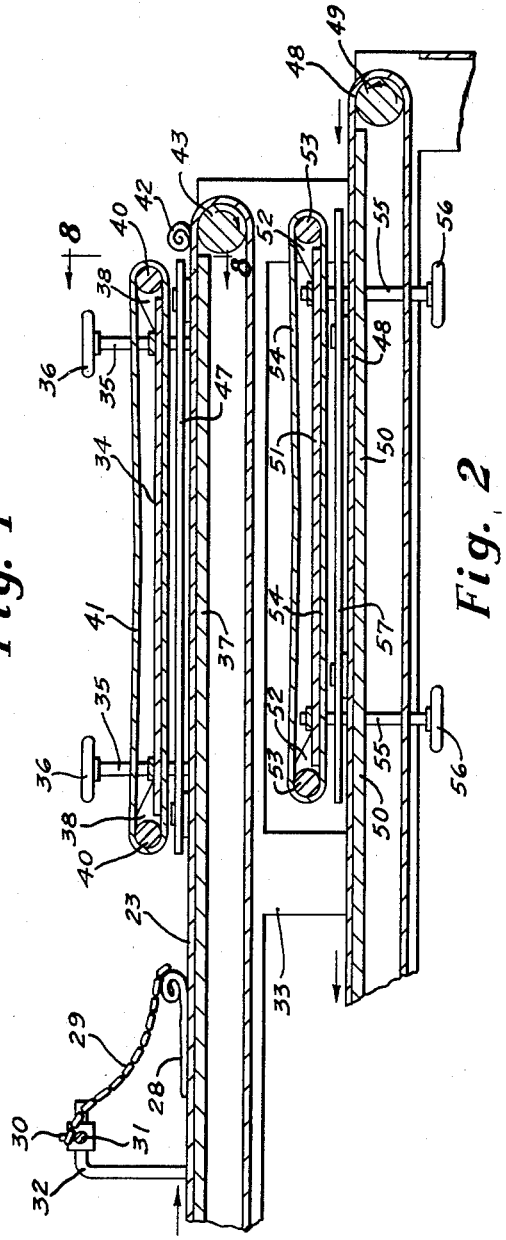
FIG. 2 is a section taken on the line 2—2 of FIG. 1 on an enlarged scale, partly broken away.

The adjustment of the pressure board backing plate 34 is such that the completed scroll, or coiled up dough piece 42, will be compacted and extended by the pressure board as it is carried along under the pressure board by means of the conveyor belt 23, which operates over the roller 43 at the discharge end thereof, said conveyor belt being driven in any desired or well known manner in the direction indicated by the arrow in FIG. 2. The coiled up dough piece or scroll of dough 42 will be rotated about its axis between the pressure board having the backing plate 34 and the conveyor belt 23 in a counter-clockwise direction, from the end thereof seen in FIG. 2, during such passage thereof between the pressure board and the belt 23 due to the cooperative action of the pressure board and belt.

Also, mounted on the frame 33 are brackets 44, which are provided with suitable clamping means 45 for holding rod-like members 46 in adjusted position in said brackets, said rod-like members 46 having mounted on the inner ends thereof a pair of guide bars 47, which are preferably adjusted so as to be slightly divergent in the direction of travel of the conveyor belt 23, and which serve as elongation limiting means for the dough piece that is being elongated and compacted by the cooperative action of the pressure board and conveyor belt 23.

A conveyor belt 48, which is driven in any suitable manner so as to travel in the direction indicated by the arrows in FIGS. 1 and 2, operates over the roller 49 that is mounted in suitable bearings on the frame 33, and over a horizontal shelf 50, which is spaced at a suitable distance below the top plate 37. The conveyor belt 48 extends outwardly beyond the discharge end of the conveyor belt 23, as will be obvious from FIGS. 1 and 2, and the coiled, elongated and compacted dough pieces 42 will drop from the discharge end of the conveyor belt 23 onto the top end of the conveyor belt 48. Cooperating with the conveyor belt 48 is a pressure board that has the backing plate 51, which constitutes the body portion of said pressure board, and which is provided with brackets 52 providing bearings for rollers 53, over which the belt-like flexible fabric member 54 extends, said belt-like fabric member being provided so as to present a clean surface to the coiled up piece of dough as it passes under the belt 54 on the under side of the backing plate 51.

The position of the backing plate 51 is adjustable by means of the adjusting members 55, which have hand wheels 56 thereon and which extend through screw-threaded openings in the shelf-like member 50, and are provided with bearings mounted on the plate 51 so as to be rotatable therein, but not endwise movable relative to the plate 51.

The pressure board backing plate 51 is adjusted with respect to the belt 48 so that the dough piece 42 will be further compacted and extended as it is carried along under the pressure board by means of the conveyor belt 48, and it will be noted that when the dough piece 42 has transferred to the conveyor belt 48 and reaches the pressure board it will be rotated in its opposite direction to the rotation thereof resulting from the cooperative acion of the first mentioned pressure board and the conveyor belt 23. Suitable guide bars 57, mounted in the same manner as the guide bars 47, are provided under the pressure board having the backing plate 51, and said guide bars are also preferably adjusted so that the same will diverge slightly toward the discharge end of the conveyor belt 48. The adjusting means, in the case of both the guide bars 47 and the guide bars 57, is such that the guide bars can be moved toward and away from each other any desired distance at either end thereof.

As will be obvious from FIG. 1, the conveyor belt 48 also extends beyond the conveyor belt 23 at the discharge end of the conveyor belt 48, said conveyor belt 48 operating over the roller 58 at the discharge end thereof, the shelf-like member 50 extending to closely adjacent the roller 58. A conveyor belt 59 is provided on the machine, that operates over the roller 60 and extends at right angles to the conveyor belt 48, and said conveyor belt 59 is part of a mechanism for coiling the elongated rod-like piece of dough into a helicoidal loaf, as disclosed in the application of Duard W. Enoch et al., Serial No. 53,557, on Loaf Coiling Bread Molding Machine, filed September 1, 1960, hereinbefore referred to. In order to transfer the dough piece from the conveyor belt 48 to the conveyor belt 59 and have it positioned on the conveyor belt 59 at the desired oblique angle to the direction of travel of the conveyor belt 59, said elongated rod-like dough pieces, that have been produced by the cooperative action of the curling chain, pressure boards and conveyor belts, must be presented to the transfer mechanism always in such a position that the axis of the elongated rod-like dough piece extends perpendicularly to the direction of travel of the conveyor belt 48.

Figure 7:
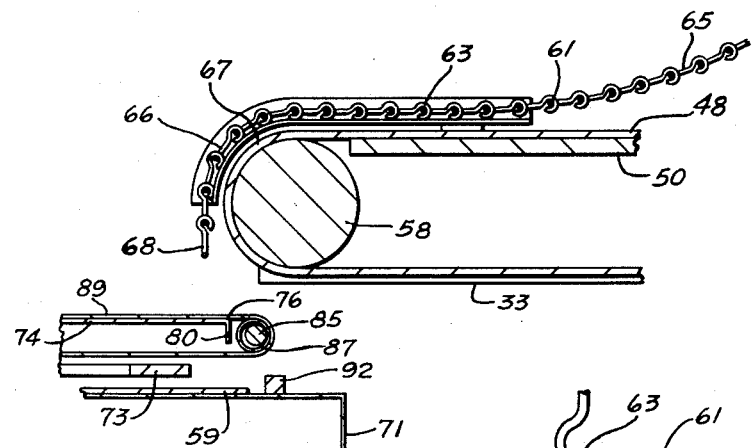
FIG. 7 is a fragmentary sectional view taken on the line 7—7 of FIG. 1.
Figure 9:
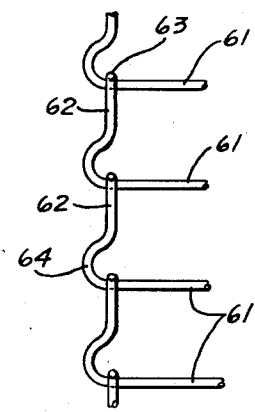
FIG. 9 is a fragmentary enlarged plan view of the linked loaf straightening means shown in FIGS. 1 and 7.

To assure such a position of the dough pieces as they are discharged from the conveyor belt 48, loaf straightening means is provided, comprising a plurality of linked members that have transversely extending rod like portions 61 and longitudinally extending portions 62 that have hook-like ends 63 that receive the transverse portions 61 therethrough so as to pivotally connect the adjacent bar-like or rod-like members 61 with each other, curved portions 64 connecting the portions 62 and 61 of said linked members. Thus a flexible chain-like member is provided that has the adjacent cross members thereof pivotally connected with each other and said chain-like member, indicated generally by the numeral 65 in FIG. 7, has a depending portion 66 extending around the portion 67 of the belt 48 that passes around the roller 58, and has an end 68 that depends below the axis of the roller 58. Preferably a pair of angular in cross section guide members 69 are provided for the linked member 65, which are adjustable toward and away from each other, being mounted on brackets 70 that are longitudinally adjustable lengthwise of themselves relative to the frame 33. Said guide members 69 are spaced from the belt 48 so as to space the chain-like member from said belt.

The roller 60 for the conveyor belt 59 is mounted on a frame 71, which may be separate from or integral with the frame 33, as may be found desirable. Mounted on the frame 71 is a sub-frame having an arm 72 and an arm 73 extending perpendicularly to each other, the arm 73 extending from substantially the middle of the arm 72, thus forming a T-shaped supplemental frame member, which has both ends of the arm 72 and the one end of the arm 73 mounted on the longitudinal spacer bars 92 on the frame 71, said T-shaped frame being merely set on said longitudinal bars 92, thus permitting removal of the T-shaped frame and all the parts carried thereby or adjustment of the position of said frame made up of the members 72 and 73 relative to the frame 71 and the conveyor 59 as may be desired.

A plate 74 is mounted on the T-shaped frame made up of the members 72 and 73, said plate having a pair of straight edges 75 and 76 extending at an oblique angle to each other and a convex outer peripheral edge 77. The inner edge of the plate-like member 74 is provided with a depending flange 78 and a horizontal flange 79 that is secured in fixed position on the frame member 73 in any suitable manner, as by welding. The edges 75 and 76 of said plate-like member are also preferably provided with depending flanges 80. Bearing brackets 81, 82, 83 and 84 are also provided on the plate-like member 74, providing bearings for the shafts 85 and 86.

Freely rotatably mounted on the shaft 86 are rollers 87, and similar rollers 87 are provided on the shaft 85. Said rollers are arranged in end to end relationship so as to extend over the shafts 85 and 86 from the bearing member at one end thereof to the respective roller 101 or 102 adjacent the bearing member at the other end of each of said shafts. Reduced end portions, such as the reduced end portion 88 of the shaft 86, extend into the bearing members 81, 82, 83 and 84. An endless arcuate conveyor belt 89 extends over the plate 74 and around the shafts 85 and 86 in engagement with the freely rotating sleeves 87 provided thereon, said belt having a convex outer peripheral edge 90 and a concave inner peripheral edge 91. Mounted on the shaft 86 to rotate therewith is a pulley 93, which is driven by the motor 94 mounted on the plate 95, that is welded on the frame member 72, through the belt 96 operating over the motor pulley 97.

Also mounted on the shaft 86 to rotate therewith is a sprocket 98. A similar sprocket 99 is mounted on the shaft 85 and a sprocket chain 100 operates over the sprockets 98 and 99 to thus drive the shafts 85 and 86 at the same rate. The roller 101 is keyed on the shaft 86 and the roller 102 is keyed on the shaft 85 said rollers positively driving the conveyor belt 89 adjacent the peripheral edge 90 thereof. The links of the sprocket chain 100 have side members 103 and 104. A curved guide rail 105 is mounted on a curved plate 106 by means of spacing members 107, said curved plate 106 being mounted on the frame member 72 by means of angle brackets 108. A guide rail 109, similar to the guide rail 105, is also mounted on the curved plate 106 by means of spacing members 110, the parts 108, 106, 107, 105, 110 and 109 being rigidly secured together in any suitable manner, as by welding. The sprocket chain will accordingly be guided in its movement by the curved guide rails or guide bars 105 and 109 operating over the two sprockets 98 and 99 at opposite ends of said guide members. A curved bearing plate 118 is welded to the outer peripheral edge 77 of the plate 74 and is provided with a nylon anti-friction wear strip 119.

Angular brackets 111 are provided on the side members 104 of the chain links and are provided with openings therein, through which the hooks 112 on the coil springs 113 extend. The other ends of the coil springs 113 are provided with hooks 114 that engage in openings 115 in the outer peripheral portion of the belt 89, said springs being under tension when the apparatus is assembled, to urge the side members 104 of the chain links toward the anti-friction wear strip 119 and hold the belt 89 taut.

Figure 3:
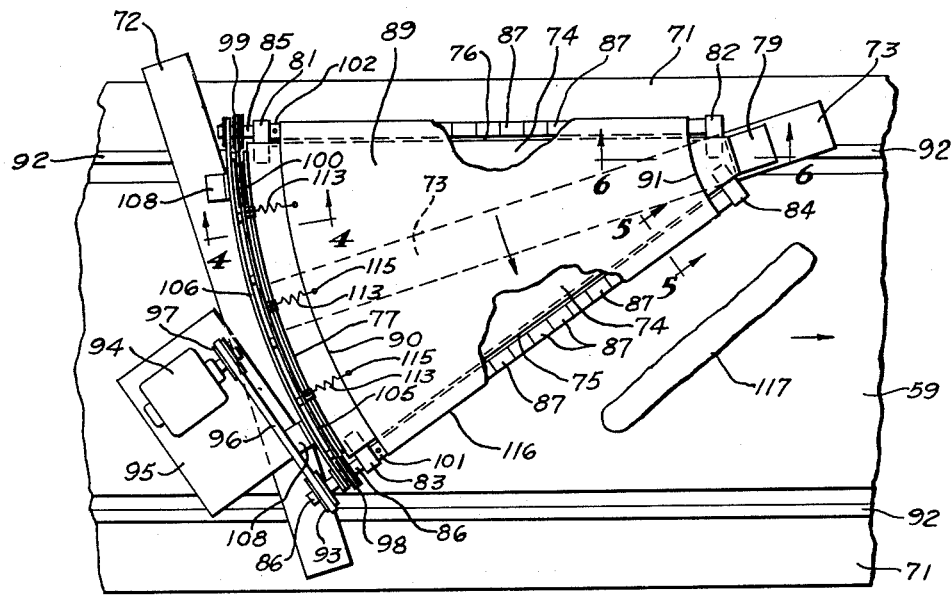
FIG. 3 is a fragmentary plan view of the molding machine, showing the turning conveyor in plan, partly broken away.
Figure 5:
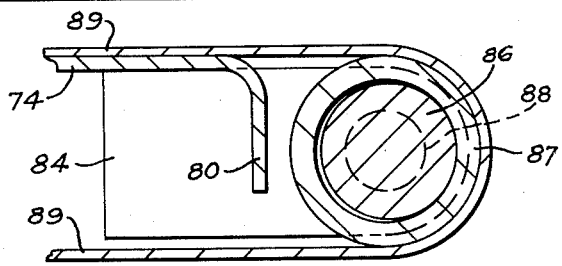
FIG. 5 is an enlarged fragmentary sectional view taken on the line 5—5 of FIG. 3.
Figure 4:
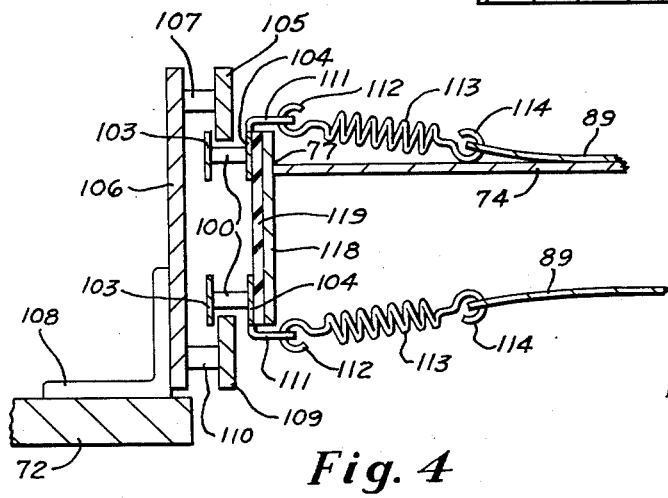
FIG. 4 is an enlarged fragmentary sectional view taken on the line 4—4 of FIG. 3.
Figure 6:
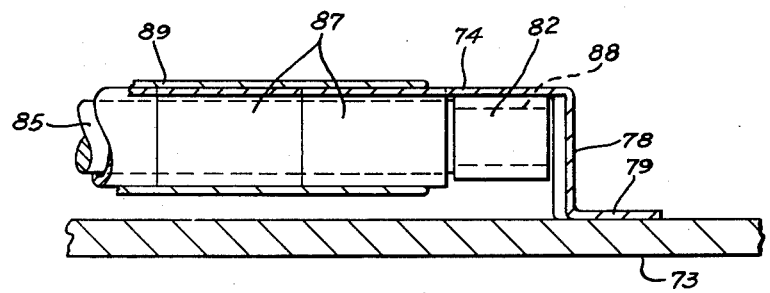
FIGURE 6 is a fragmentary sectional view on an enlarged scale taken on the line 6—6 of FIG. 3.

It will be obvious that as the motor 94 drives the shaft 86 the cooperative action of the sprockets 98 and 99, sprocket chain 100 and the rollers 101 and 102 will drive the belt 89, the direction of travel of the belt being that indicated by the arrow in FIGS. 1 and 3. As the outer peripheral portion of the belt will have a much greater lineal speed than the inner peripheral portion thereof, the rollers 87 on the shafts 85 and 86 will rotate independently of the shafts 85 and 86, being retarded in their rotation relative to the shaft on which the same are mounted due to the holding action of the belt passing around the same. The discharge edge of the arcuate belt, indicated by the numeral 116, is such that the dough pieces, which have been deposited on said belt 89 with the longitudinal axes thereof extending perpendicularly to the direction of travel of the belt 48, will be turned so that the same will be positioned on the belt 59 at a suitable oblique angle to the direction of travel thereof for the helical coiling up of the elongated dough piece into a helicoidal loaf, or for any other purpose for which it may be desired to discharge an elongated rod-like piece of dough onto the belt 59 in a direction oblique to its direction of travel. Such a dough piece is shown after discharge onto the belt 59 in its obliquely extending position at 117 in FIG. 3.

What I claim is:

1. In a bread molding machine an arcuate belt conveyor comprising a frame, a pair of shafts mounted on said frame to rotate about axes extending angularly to each other, rollers rotatably mounted on said shafts, an endless arcuate conveyor belt having a convex outer peripheral edge and a concave inner peripheral edge extending around said rollers, an arcuate bearing plate on said frame defining a guideway, a sprocket chain operating on said bearing plate, resilient means connecting said chain with the outer peripheral portion of said conveyor belt, said resilient means extending to pull said chain toward said bearing plate and radially outwardly on said belt, sprockets on said shafts around which said chain engages, means for driving one of said sprockets, means for feeding molded dough pieces onto said belt adjacent one end thereof and a conveyor belt extending under said arcuate conveyor at the other end thereof to receive dough pieces discharged therefrom.

2. In a bread molding machine an arcuate belt conveyor comprising a frame, a pair of shafts mounted on said frame to rotate about axes extending angularly to each other, rollers rotatably mounted on said shafts, an endless arcuate conveyor belt having a convex outer peripheral edge and a concave inner peripheral edge extending around said rollers, an arcuate guideway on said frame, said guideway including a curved bearing plate having a wear resistant anti-friction facing thereon, a sprocket chain operating in said guideway, yielding means connecting said chain with the outer peripheral portion of said conveyor belt, sprockets on said shafts around which said chain engages, means for driving one of said sprockets, means for feeding molded dough pieces onto said belt adjacent one end thereof and a conveyor belt extending under said arcuate conveyor at the other end thereof to receive dough pieces discharged therefrom.

3. In a bread molding machine, means for molding a quantity of dough into an elongated dough piece, including a conveyor belt having said elongated dough piece positioned thereon transversely thereof, flexible loaf straightening means at the discharge end of said conveyor belt extending over said discharge end of said belt to position said elongated dough piece with the longitudinal axis thereof extending perpendicularly to the direction of travel of said belt, comprising linked members having rod-like portions extending transversely of said conveyor belt and supporting means engaged by said linked members positioned to space said rod-like members from said belt, a second belt traveling at right angles to said first mentioned belt and means for transferring said elongated dough piece from said first mentioned belt to said second mentioned belt to deposit said dough piece on said second mentioned belt with its longitudinal axis extending at an oblique angle to the direction of travel of said second mentioned belt, comprising an arcuate belt conveyor having a convex outer peripheral edge and a concave inner peripheral edge, said arcuate belt conveyor having its receiving end mounted under the discharge end of said first conveyor belt to receive said elongated dough pieces substantially radially thereon and having a discharge edge overlying said second mentioned belt and extending at said oblique angle to the direction of travel of said second mentioned conveyor belt.

4. In a bread molding machine, means for molding a quantity of dough into an elongated dough piece, including a conveyor belt having said elongated dough piece positioned at right angles thereto and means for transferring said elongated dough piece from said first mentioned belt to a second conveyor belt to deposit said dough piece on said second mentioned belt with its longitudinal axis extending at an oblique angle to the direction of travel of said second mentioned conveyor belt, comprising a frame mounted to extend over said second mentioned belt and under the discharge end of said first mentioned belt, a pair of shafts mounted on said frame to rotate about axes extending angularly to each other, rollers mounted on each of said shafts for rotation independently of each other relative thereto, an endless conveyor belt having a convex outer peripheral edge and a concave inner peripheral edge extending around said rollers and means mounted on said frame for driving said belt comprising a motor and a flexible member driven thereby and connected with the outer periphery of said belt to pull thereon.

5. In a bread molding machine, means for molding a quantity of dough into an elongated dough piece, including a first conveyor belt having the elongated dough piece positioned thereon transversely thereof, a second conveyor belt extending below the discharge end of said first conveyor belt transversely thereof, a frame having bars extending longitudinally of said second conveyor belt adjacent the longitudinal edges thereof, an arcuate belt conveyor comprising a frame extending across said second conveyor and mounted on said longitudinally extending bars for movement thereon, a pair of shafts mounted on said frame to rotate about axes extending angularly to each other, rollers independently rotatably mounted on each of said shafts, an endless arcuate conveyor belt having a convex outer peripheral edge and a concave inner peripheral edge extending around said rollers and means mounted on said arcuate conveyor frame for driving said arcuate conveyor belt, said arcuate conveyor having a receiving end below the discharge end of said first conveyor belt and a discharge end located over and extending across said second conveyor belt.

References Cited in the file of this patent

UNITED STATES PATENTS

| | | |
|---|---|---|
| 806,869 | Burns | Dec. 12, 1905 |
| 1,669,220 | Thropp et al. | May 8, 1928 |
| 1,698,786 | Finn | Jan. 15, 1929 |
| 1,895,634 | Lauterbur et al. | Jan. 31, 1933 |
| 2,596,313 | Wagoner | May 13, 1952 |
| 2,633,975 | Koerber | Apr. 7, 1953 |
| 2,640,444 | Reget | June 2, 1953 |
| 2,671,416 | Steadman | Mar. 9, 1954 |
| 2,750,899 | Marasso | June 19, 1956 |
| 2,782,734 | Nichols | Feb. 26, 1957 |
| 3,044,603 | Fry | July 13, 1962 |

FOREIGN PATENTS

| | | |
|---|---|---|
| 733,498 | Great Britain | July 13, 1955 |